US012732913B2

(12) United States Patent
Zhang et al.

(10) Patent No.: US 12,732,913 B2
(45) Date of Patent: Sep. 8, 2026

(54) METHOD AND DEVICE FOR INDICATING AN EXPIRATION OF A DATA INACTIVITY TIMER

(71) Applicant: Apogee 5G Global, LLC, Plano, TX (US)

(72) Inventors: Jinfang Zhang, Shanghai (CN); Xiaobo Zhang, Shanghai (CN)

(73) Assignee: Apogee 5G Global, LLC, Plano, TX (US)

(*) Notice: Subject to any disclaimer, the term of this patent is extended or adjusted under 35 U.S.C. 154(b) by 114 days.

(21) Appl. No.: 18/107,507

(22) Filed: Feb. 9, 2023

(65) Prior Publication Data

US 2023/0269665 A1 Aug. 24, 2023

(30) Foreign Application Priority Data

Feb. 23, 2022 (CN) ......................... 202210166196.6

(51) Int. Cl.
*H04W 76/38* (2018.01)
*H04W 52/02* (2009.01)
(Continued)

(52) U.S. Cl.
CPC ....... *H04W 52/0229* (2013.01); *H04W 76/27* (2018.02)

(58) Field of Classification Search
CPC ... H04W 52/0229; H04W 76/27; H04W 4/06; H04W 76/38; H04W 76/40;
(Continued)

(56) References Cited

U.S. PATENT DOCUMENTS

| | | | |
|---|---|---|---|
| 8,649,311 | B2 | 2/2014 | Xu et al. |
| 9,143,867 | B2 | 9/2015 | Nabata et al. |

(Continued)

FOREIGN PATENT DOCUMENTS

| | | | |
|---|---|---|---|
| CN | 101166145 | A | 4/2008 |
| WO | 2021041193 | A1 | 3/2021 |

OTHER PUBLICATIONS

Third Generation Partnership Project, "Technical Specification Group Radio Access Network; NR; Physical layer procedures for control (Release 17)," 3GPP TS 38.213 V17.0.0 (Dec. 2021).

(Continued)

*Primary Examiner* — Andrew Wendell
(74) *Attorney, Agent, or Firm* — Volpe Koenig

(57) ABSTRACT

A method and a device used for wireless communications. A first node receives a first radio signal, and decodes the first radio signal for obtaining at least one MAC SDU, any MAC SDU of the at least one MAC SDU belonging to a target logical channel set; and determines whether to initialize a first timer according to whether the at least one MAC SDU belongs to a given logical channel set, specifically comprising: if any of the at least one MAC SDU belongs to the given logical channel set, initializing the first timer; if none of the at least one MAC SDU belongs to the given logical channel set, not initializing the first timer; herein, the first radio signal is scrambled by a non-unicast RNTI; any logical channel in the target logical channel set is used for multicast MBS. This application helps greatly reduce the UE power consumption.

16 Claims, 4 Drawing Sheets

(51) Int. Cl.
*H04W 72/231* (2023.01)
*H04W 76/27* (2018.01)

(58) Field of Classification Search
CPC ......... H04W 52/0232; H04W 52/0261; H04W 72/231; H04W 80/08; H04L 12/189
See application file for complete search history.

(56) References Cited

U.S. PATENT DOCUMENTS

| | | | | |
|---|---|---|---|---|
| 10,993,192 | B2 * | 4/2021 | Lin | H04W 52/42 |
| 11,452,169 | B2 * | 9/2022 | Wu | H04W 76/15 |
| 11,838,936 | B2 * | 12/2023 | Kung | H04W 72/54 |
| 11,902,940 | B2 * | 2/2024 | Li | H04W 4/40 |
| 12,207,317 | B2 * | 1/2025 | Enbuske | H04W 74/085 |
| 2010/0284376 | A1 * | 11/2010 | Park | H04W 56/0045 370/336 |
| 2012/0076068 | A1 * | 3/2012 | Zhao | H04L 1/0003 370/312 |
| 2018/0160342 | A1 * | 6/2018 | Park | H04W 36/0033 |
| 2019/0342941 | A1 * | 11/2019 | Tang | H04L 69/324 |
| 2020/0187235 | A1 * | 6/2020 | Wu | H04W 80/08 |
| 2022/0046471 | A1 * | 2/2022 | Xie | H04W 28/065 |
| 2022/0103298 | A1 * | 3/2022 | Lee | H04L 1/1883 |
| 2022/0322419 | A1 * | 10/2022 | Jeon | H04W 76/30 |
| 2022/0361275 | A1 * | 11/2022 | Da Silva | H04W 76/18 |
| 2023/0068311 | A1 * | 3/2023 | Kim | H04W 76/40 |
| 2023/0085861 | A1 * | 3/2023 | Kim | H04W 48/10 455/414.1 |
| 2023/0254933 | A1 | 8/2023 | Han | |
| 2023/0292092 | A1 | 9/2023 | Hong | |
| 2023/0403705 | A1 * | 12/2023 | Yu | H04W 72/1273 |
| 2024/0187140 | A1 * | 6/2024 | Di Girolamo | H04L 1/188 |

OTHER PUBLICATIONS

Third Generation Partnership Project, "Technical Specification Group Radio Access Network; NR; Physical layer procedures for data (Release 17)," 3GPP TS 38.214 V17.0.0 (Dec. 2021).

Third Generation Partnership Project, "Technical Specification Group Radio Access Network; NR; Medium Access Control (MAC) protocol specification (Release 16)," 3GPP TS 38.321 V16.7.0 (Dec. 2021).

* cited by examiner

900

First receiver 901

First node

First processor 902

METHOD AND DEVICE FOR INDICATING AN EXPIRATION OF A DATA INACTIVITY TIMER

CROSS REFERENCE TO RELATED APPLICATIONS

This application claims the priority benefit of Chinese Patent Application No. 202210166196.6, filed on Feb. 23, 2022, the full disclosure of which is incorporated herein by reference.

BACKGROUND

Technical Field

The present application relates to a method and a device used in wireless communication systems, and in particular to a transmission method and device supporting MBS services in wireless communications.

Related Art

The feature of multicast/broadcast transmission is not supported in the earliest version(s) of the fifth Generation (5G), that is, the Rel 15 and Rel 16, but in many significant application scenarios, such as public safety and mission critical, the application of Vehicle-to-Everything (V2X), software delivery and group communications, the one-to-many transmission feature of multicast/broadcast communications can enhance the system performance and user experience in a striking way. For better support to multicast/broadcast communications, a round of discussions on 5G broadcast evolution have been made between the 3rd Generation Partner Project (3GPP) Radio Access Network (RAN) #78 Plenary and RAN #80 Plenary, and a Study Item (SI) of the architecture evolution of 5G broadcast services is approved by the Service and System Aspects (SA) #85 session. To support reliable transmission of multicast/broadcast service (MBS), the 3GPP has conducted studies in Rel-17 on MBS transmissions when a User Equipment (UE) is in RRC_CONNECTED state. For a further reduction in UE power consumption, the 3GPP starts discussions over the support to MBS transmissions when a UE is in RRC_INACTIVE state in Rel-18.

SUMMARY

Inventors find through researches that MBS data packets can be multiplexed and transmitted together, in the case that the UE hasn't received any interested MBS packet for a long time, if it continues to monitor MBS transmission, a remarkable increase in UE power consumption will be seen.

The present application discloses a solution, that is, to monitor through a timer whether an interested MBS packet of the UE is received, and, when there is a long period when no MBS packets that the UE is interested in has been received, to indicate to an upper layer, so that the beneficial effect of reducing power consumption can be achieved. Though originally targeted at a Uu air interface, the present application is also applicable to a PC5 air interface. Additionally, the adoption of a unified solution for various scenarios, including but not limited to uplink communications, contributes to the reduction of hardcore complexity and costs. In the case of no conflict, the embodiments of a first node and the characteristics in the embodiments may be applied to any other node, and vice versa. What's more, the embodiments in the present application and the characteristics in the embodiments can be arbitrarily combined if there is no conflict. Particularly, for interpretations of the terminology, nouns, functions and variants (unless otherwise specified) in the present application, refer to definitions given in TS36 series, TS38 series and TS37 series of 3GPP specifications.

The present application provides a method in a first node for wireless communications, comprising:

receiving a first radio signal, and decoding the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and determining whether to initialize a first timer according to whether the at least one MAC SDU belongs to a given logical channel set, the given logical channel set being a subset of the target logical channel set;

herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node.

In one embodiment, by maintaining a first timer, the above method effectively monitors whether a Radio Bearer is active.

In one embodiment, by maintaining a first timer, the above method significantly reduces the UE power consumption.

In one embodiment, by maintaining a first timer, the above method effectively avoids RRC state out-of-sync between the UE and the base station.

In one embodiment, the method above multiplexes a MAC SDU that does not belong to a given logical channel set to be transmitted in a first MAC PDU, thus saving the overhead of the scheduling signaling and enhancing the utilization ratio of radio resources.

In one embodiment, as provided in the method above, only when the at least one MAC SDU belongs to the given logical channel set will the first timer be initialized, for obtaining the benefit of power saving.

According to one aspect of the present application, comprising:

the first node being in an RRC state other than RRC-Idle.

In one embodiment, the above method applies to a case when a UE is in a Radio Resource Control (RRC) state other than RRC_Idle.

According to one aspect of the present application, comprising:

as a response to expiration of the first timer, conveying a first indication to an upper layer from a MAC sublayer;

herein, the first timer is maintained in the MAC sublayer.

According to one aspect of the present application, comprising:

receiving a first message, the first message indicating at least one multicast MRB;

herein, each multicast MRB of the at least one multicast MRB is associated with an interested MBS session of the first node.

According to one aspect of the present application, comprising:

receiving a second message, the second message indicating at least one logical channel;

herein, each logical channel of the at least one logical channel is associated with a multicast MRB of the at least one multicast MRB; the at least one logical channel belongs to the given logical channel set.

According to one aspect of the present application, comprising:

the non-unicast RNTI being a G-RNTI, or a G-CS-RNTI.

According to one aspect of the present application, comprising:

a logical channel that belongs to the target logical channel set but does not belong to the given logical channel set being not configured for the first node;

herein, at least one logical channel comprised in the target logical channel set does not belong to the given logical channel set.

The present application provides a first node for wireless communications, comprising:

a first receiver, receiving a first radio signal, and decoding the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and a first processor, determining whether to initialize a first timer according to whether the at least one MAC SDU belongs to a given logical channel set, the given logical channel set being a subset of the target logical channel set;

herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node.

The present application provides a method in a first node for wireless communications, comprising:

receiving a first radio signal, and decoding the first radio signal for obtaining a first MAC PDU, the first MAC PDU comprising a first MAC SDU set, any MAC SDU in the first MAC SDU set belonging to a target logical channel set; and determining according to whether any MAC SDU in the first MAC SDU set belongs to a given logical channel set whether the MAC SDU is to be dropped from the first MAC SDU set; and determining whether a first timer is to be initialized depending on whether the first MAC SDU set updated is empty;

herein, the first radio signal is scrambled by a non-unicast RNTI; the action of determining according to whether any MAC SDU in the first MAC SDU set belongs to a given logical channel set whether the MAC SDU is to be dropped comprises: when any MAC SDU in the first MAC SDU set does not belong to a given logical channel set, dropping the MAC SDU; when any MAC SDU in the first MAC SDU set belongs to a given logical channel set, not dropping the MAC SDU; the action of determining whether a first timer is to be initialized depending on whether the first MAC SDU set updated is empty comprises: when the first MAC SDU set updated is not empty, initializing the first timer; when the first MAC SDU set is empty, not initializing the first timer; any logical channel in the target logical channel set is used for multicast MBS; any logical channel in the given logical channel set is used for an interested MBS session of the first node; the target logical channel set comprises at least one logical channel; the first MAC SDU set comprises at least one MAC SDU.

In one embodiment, the phrase of dropping the MAC SDU comprises: dropping a MAC subPDU to which a MAC SDU belongs.

In one embodiment, the phrase of dropping the MAC SDU comprises: dropping a MAC SDU and a MAC subheader to which the MAC SDU corresponds.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
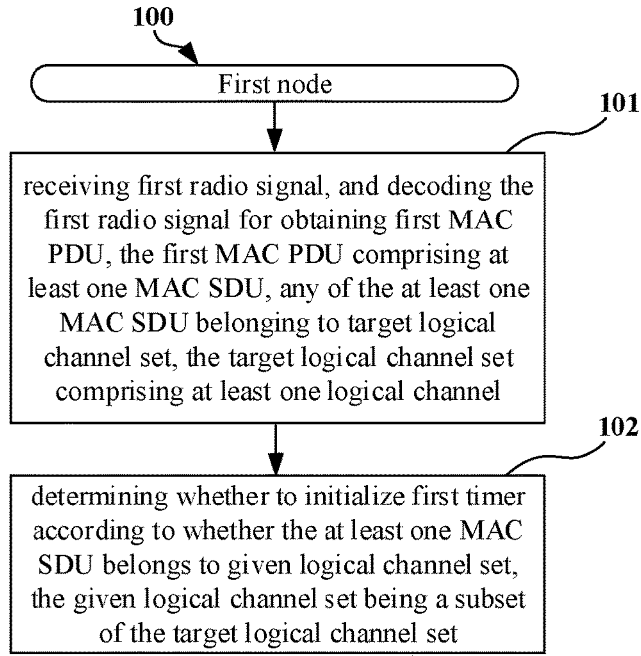
FIG. 1 illustrates a flowchart of transmission of a first node according to one embodiment of the present application.

Embodiment 1 illustrates a flowchart of transmission of a first node according to one embodiment of the present application, as shown in FIG. 1.

In Embodiment 1, the first receiver 100 in step 101 receives a first radio signal, and decodes the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and determines in step 102 whether to initialize a first timer according to whether the at least one MAC SDU belongs to a given logical channel set, the given logical channel set being a subset of the target logical channel set; herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node.

In one embodiment, the first radio signal is received through an air interface.

In one embodiment, the air interface is an NR air interface.

In one embodiment, the air interface is a Uu air interface.

In one embodiment, the air interface is a PC5 air interface.

In one embodiment, the first radio signal is a Physical Downlink Shared Channel (PDSCH).

In one embodiment, the first radio signal is a Physical Sidelink Shared Channel (PSSCH).

In one embodiment, there is no less than 1 target receiver of the first radio signal.

In one embodiment, the first radio signal is decoded for obtaining a first Medium Access Control (MAC) Protocol Data Unit (PDU).

In one embodiment, the first radio signal is a new transmission of a Transport Block (TB).

In one embodiment, the first radio signal is a retransmission of a TB.

In one subembodiment of the above two embodiments, the first MAC PDU is used for generating the TB.

In one embodiment, the first MAC PDU comprises at least one bit.

In one embodiment, the first MAC PDU comprises at least one MAC Service Data Unit (SDU).

In one embodiment, the first radio signal is scrambled by a non-unicast Radio Network Temporary Identifier (RNTI).

In one embodiment, the non-unicast RNTI is used for generating a sequence and the sequence is used for scrambling the first radio signal.

In one embodiment, there is no less than 1 target receiver of a signal scrambled by the non-unicast RNTI.

In one embodiment, the non-unicast RNTI is used for identifying a multicast MBS.

In one embodiment, the non-unicast RNTI is associated with at least one MBS radio bearer; each of the at least one MBS radio bearer is used for multicast MBS.

In one embodiment, the non-unicast RNTI is associated with at least one multicast MRB.

In one embodiment, the non-unicast RNTI is used for identifying data belonging to the at least one multicast MRB.

In one embodiment, the non-unicast RNTI is configured for the first node by a unicast signaling.

In one embodiment, the unicast signaling is only received by a specific UE.

In one embodiment, the non-unicast RNTI is configured for a group of specific UEs by a multicast signaling, the group of specific UEs comprising the first node.

In one embodiment, the non-unicast RNTI is not configured for a UE by a broadcast signaling.

In one embodiment, any MAC SDU of the at least one MAC SDU belongs to a target logical channel set, the target logical channel set comprising at least one logical channel.

In one embodiment, a MAC SDU is indicated by a logical channel identity (LCID), the LCID indicating a logical channel to which the MAC SDU belongs.

In one embodiment, any logical channel in the target logical channel set is used for multicast MBS.

In one embodiment, any logical channel in the target logical channel set is used for multicast MBS traffics.

In one embodiment, any logical channel in the target logical channel set is an MBS Traffic Channel (MTCH).

In one embodiment, the non-unicast RNTI is associated with at least one MRB, and any of the at least one MRB is associated with a logical channel, the logical channel being transmitted in a point to multipoint (PTM) mode.

In one embodiment, whether to initialize a first timer is determined according to whether the at least one MAC SDU belongs to a given logical channel set.

In one embodiment, the phrase of initializing a first timer comprises: starting or restarting a first timer.

In one embodiment, the phrase of initializing a first timer comprises: restarting the first timer when the first timer is running; starting the first timer when the first timer is not running.

In one embodiment, the phrase that the first timer is not running comprises: the first timer being stopped.

In one embodiment, the phrase that the first timer is not running comprises: the first timer being expired.

In one embodiment, if any of the at least one MAC SDU belongs to the given logical channel set, initializing the first timer; if none of the at least one MAC SDU belongs to the given logical channel set, not initializing the first timer.

In one embodiment, any logical channel in the given logical channel set is used for multicast MBS.

In one embodiment, any logical channel in the given logical channel set is used for multicast MBS traffics.

In one embodiment, any logical channel in the given logical channel set is a MTCH.

In one embodiment, the given logical channel set comprises at least one logical channel.

In one embodiment, the given logical channel set is a subset of the target logical channel set.

In one embodiment, any logical channel comprised in the target logical channel set belongs to the given logical channel set.

In one embodiment, at least one logical channel comprised in the target logical channel set does not belong to the given logical channel set.

In one embodiment, any logical channel in the given logical channel set is used for an interested MBS session of the first node.

In one embodiment, any logical channel in the target logical channel set is a MTCH, the given logical channel set is a subset of the target logical channel set, and any logical channel in the given logical channel set is used for an interested MBS session of the first node.

In one embodiment, any logical channel in the given logical channel set is configured for the first node by a unicast signaling.

In one embodiment, any logical channel in the given logical channel set can be added or modified by a unicast signaling.

In one embodiment, any logical channel in the given logical channel set can be released by a unicast signaling.

In one embodiment, a first receiver receives a first radio signal, and decodes the first radio signal for obtaining a first MAC PDU, the first MAC PDU comprising a first MAC SDU set, any MAC SDU in the first MAC SDU set belonging to a target logical channel set; and a first processor determines according to whether any MAC SDU in the first MAC SDU set belongs to a given logical channel set whether the MAC SDU is to be dropped from the first MAC SDU set; and the first processor determines whether a first timer is to be initialized depending on whether the first MAC SDU set updated is empty; herein, the first radio signal is scrambled by a non-unicast RNTI; the action of determining according to whether any MAC SDU in the first MAC SDU set belongs to a given logical channel set whether the MAC SDU is to be dropped comprises: when any MAC SDU in the first MAC SDU set does not belong to a given logical channel set, dropping the MAC SDU; when any MAC SDU in the first MAC SDU set belongs to a given logical channel set, not dropping the MAC SDU; the action of determining whether a first timer is to be initialized depending on whether the first MAC SDU set updated is empty comprises: initializing the first timer when the first MAC SDU set updated is not empty; and not initializing the first timer when the first MAC SDU set updated is empty; any logical channel in the target logical channel set is used for multicast MBS; any logical channel in the given logical channel set is used for an interested MBS session of the first node; the target logical channel set comprises at least one logical channel; the first MAC SDU set comprises at least one MAC SDU.

Embodiment 2

Figure 2:
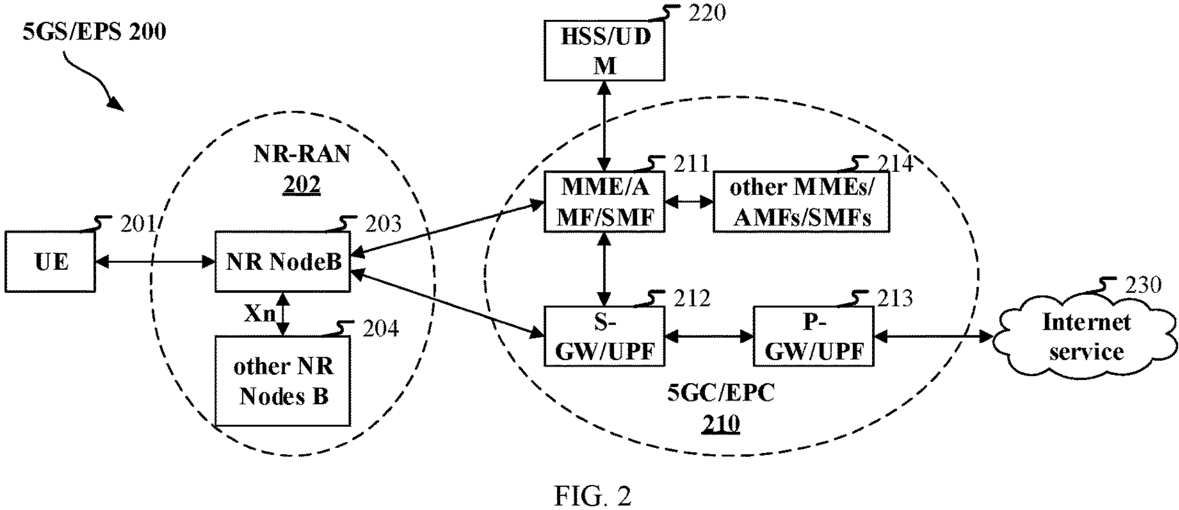
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 illustrates a network architecture 200 of NR 5G, Long-Term Evolution (LTE), and Long-Term Evolution Advanced (LTE-A) systems. The NR 5G or LTE, or LTE-A network architecture 200 may be called a 5G System/Evolved Packet System (5GS/EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The XnAP protocol at the Xn interface is used for transmitting messages of the control plane of the wireless network, while the user-plane protocol at the Xn interface is used for transmitting data of the user plane. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 can be a satellite, an aircraft or a terrestrial base station relayed through the satellite. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communication units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE 201 corresponds to a first node in the present application.

In one embodiment, the gNB203 corresponds to a second node in the present application.

In one embodiment, the gNB203 is a Macro Cell base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large time-delay difference.

In one embodiment, the gNB203 is a flight platform.

In one embodiment, the gNB203 is satellite equipment.

In one embodiment, a radio link from the UE201 to the gNB203 is uplink.

In one embodiment, a radio link from the gNB203 to the UE201 is downlink.

In one embodiment, the UE201 and the gNB203 are connected by a Uu interface.

Embodiment 3

Figure 3:
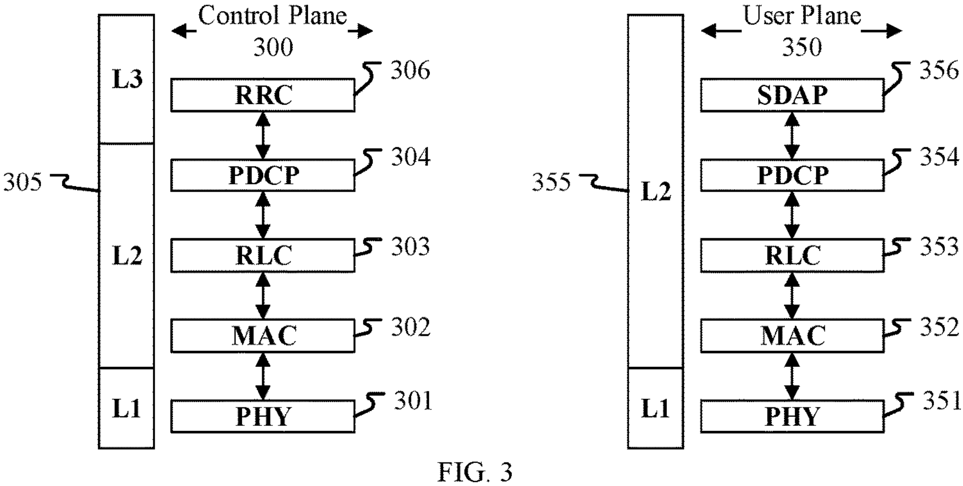
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 of a UE and a gNB is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection, and also support for handover of a UE between gNBs. The RLC sublayer 303 provides segmentation and reassembling of a packet, retransmission of a lost packet through ARQ, and detection of duplicate packets and protocol errors. The MAC sublayer 302 provides mappings between a logical channel and a transport channel as well as multiplexing of logical channel ID. The MAC sublayer 302 is also responsible for allocating between UEs various radio resources (i.e., resource block) in a cell. The MAC sublayer 302 is also in charge of Hybrid Automatic Repeat Request (HARQ) operation. In the control plane 300, The Radio Resource Control (RRC) sublayer 306 in the L3 layer is responsible for acquiring radio resources (i.e., radio bearer) and configuring the lower layer using an RRC signaling between the gNB and the UE. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between Quality of Service (QoS) streams and a Data Radio Bearer (DRB), so as to support diversified traffics. The radio protocol architecture of UE in the user plane 350 may comprise all or part of protocol sublayers of a SDAP sublayer 356, a PDCP sublayer 354, a RLC sublayer 353 and a MAC sublayer 352 in L2. Although not described in FIG. 3, the UE may comprise several higher layers above the L2 355, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to a first node in the present application.

In one embodiment, the radio protocol architecture in FIG. 3 is applicable to a second node in the present application.

In one embodiment, entities of multiple sublayers of the control plane in FIG. 3 form a Signaling Radio Bearer (SRB) vertically.

In one embodiment, entities of multiple sublayers of the user plane in FIG. 3 form a Data Radio Bearer (DRB) vertically.

In one embodiment, entities of multiple sublayers of the user plane in FIG. 3 form a MBS Radio Bearer (MRB) vertically.

In one embodiment, the first radio signal in the present application is generated by the PHY301 and the PHY351.

In one embodiment, the first message in the present application is generated by the RRC306.

In one embodiment, the second message in the present application is generated by the RRC306.

In one embodiment, the first MAC PDU in the present application is generated by the MAC302 and the MAC352.

In one embodiment, the L2 305 belongs to an upper layer.

In one embodiment, the RRC sublayer 306 in the L3 belongs to an upper layer.

Embodiment 4

Figure 4:
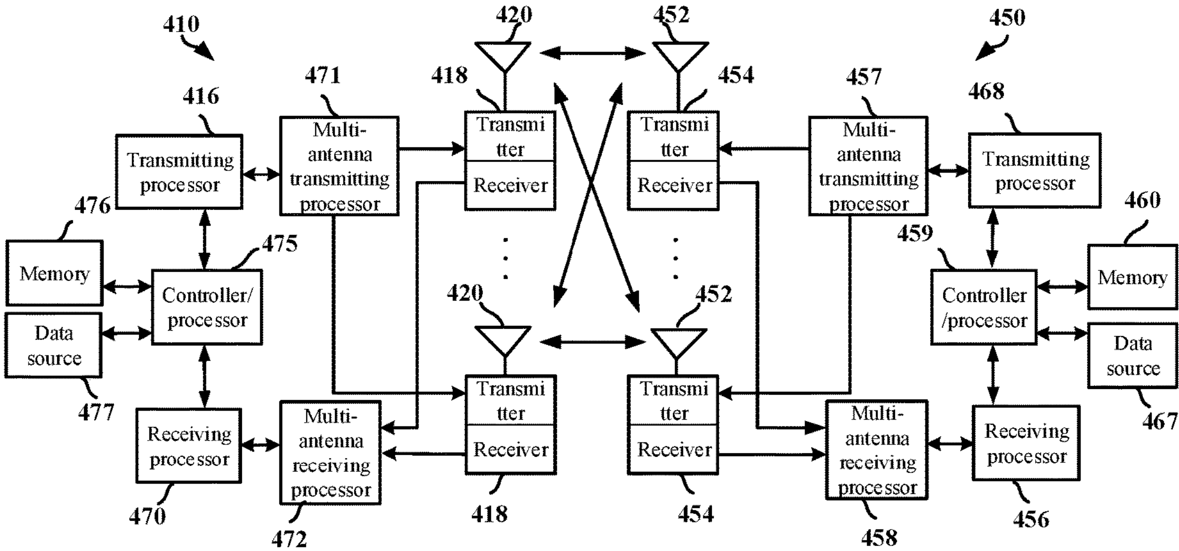
FIG. 4 illustrates a schematic diagram of hardcore modules in a communication device according to one embodiment of the present application.

Embodiment 4 illustrates a schematic diagram of hardcore modules in a communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network or from a data source 477 is provided to the controller/processor 475. The core network and data source 477 represents all protocol layers above the L2 layer. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In a transmission from the second communication device 410 to the first communication device 450, the controller/processor 459 provides de-multiplexing between a transport channel and a logical channel, packet reassembling, decrypting, header decompression, control signal processing so as to recover a higher-layer packet from the second communication device 410. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device 450. The higher-layer packet coming from the controller/processor 475 may be provided to the core network, or all protocol layers above the L2, or, various control signals can be provided to the core network or L3 for processing.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first radio signal, and decoding the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and determines whether to initialize a first timer according to whether the at least one MAC SDU belongs to a given logical channel set, the given logical channel set being a subset of the target logical channel set; herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node.

In one embodiment, the first communication device 450 comprises a memory that stores a computer readable instruction program, the computer readable instruction program generates actions when executed by at least one processor, which include: receiving a first radio signal, and decoding the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and determining whether to initialize a first timer according to whether the at least one MAC SDU belongs to a given logical channel set, the given logical channel set being a subset of the target logical channel set; herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node.

In one embodiment, the second communication device 410 comprises at least one processor and at least one memory, the at least one memory comprises computer program codes; the at least one memory and the computer program codes are configured to be used in collaboration with the at least one processor.

In one embodiment, the second communication device 410 comprises a memory that stores a computer readable instruction program, the computer readable instruction program generates actions when executed by at least one processor.

In one embodiment, the first communication device 450 corresponds to the first node in the present application.

In one embodiment, the second communication device 410 corresponds to the second node in the present application.

In one embodiment, the first communication device 450 is a UE.

In one embodiment, the second communication device 410 is a base station.

In one embodiment, at least one of the antenna 420, the transmitter 418, the multi-antenna transmitting processor 471, the transmitting processor 416 or the controller/processor 475 is used for transmitting a first radio signal in the present application.

In one embodiment, at least one of the antenna 452, the receiver 454, the multi-antenna receiving processor 458, the receiving processor 456 or the controller/processor 459 is used for receiving a first radio signal in the present application.

In one embodiment, at least one of the antenna 420, the transmitter 418, the multi-antenna transmitting processor 471, the transmitting processor 416 or the controller/processor 475 is used for transmitting a first message in the present application.

In one embodiment, at least one of the antenna 452, the receiver 454, the multi-antenna receiving processor 458, the receiving processor 456 or the controller/processor 459 is used for receiving a first message in the present application.

In one embodiment, at least one of the antenna 420, the transmitter 418, the multi-antenna transmitting processor 471, the transmitting processor 416 or the controller/processor 475 is used for transmitting a second message in the present application.

In one embodiment, at least one of the antenna 452, the receiver 454, the multi-antenna receiving processor 458, the receiving processor 456 or the controller/processor 459 is used for receiving a second message in the present application.

Embodiment 5

Figures 5, 6, 7:
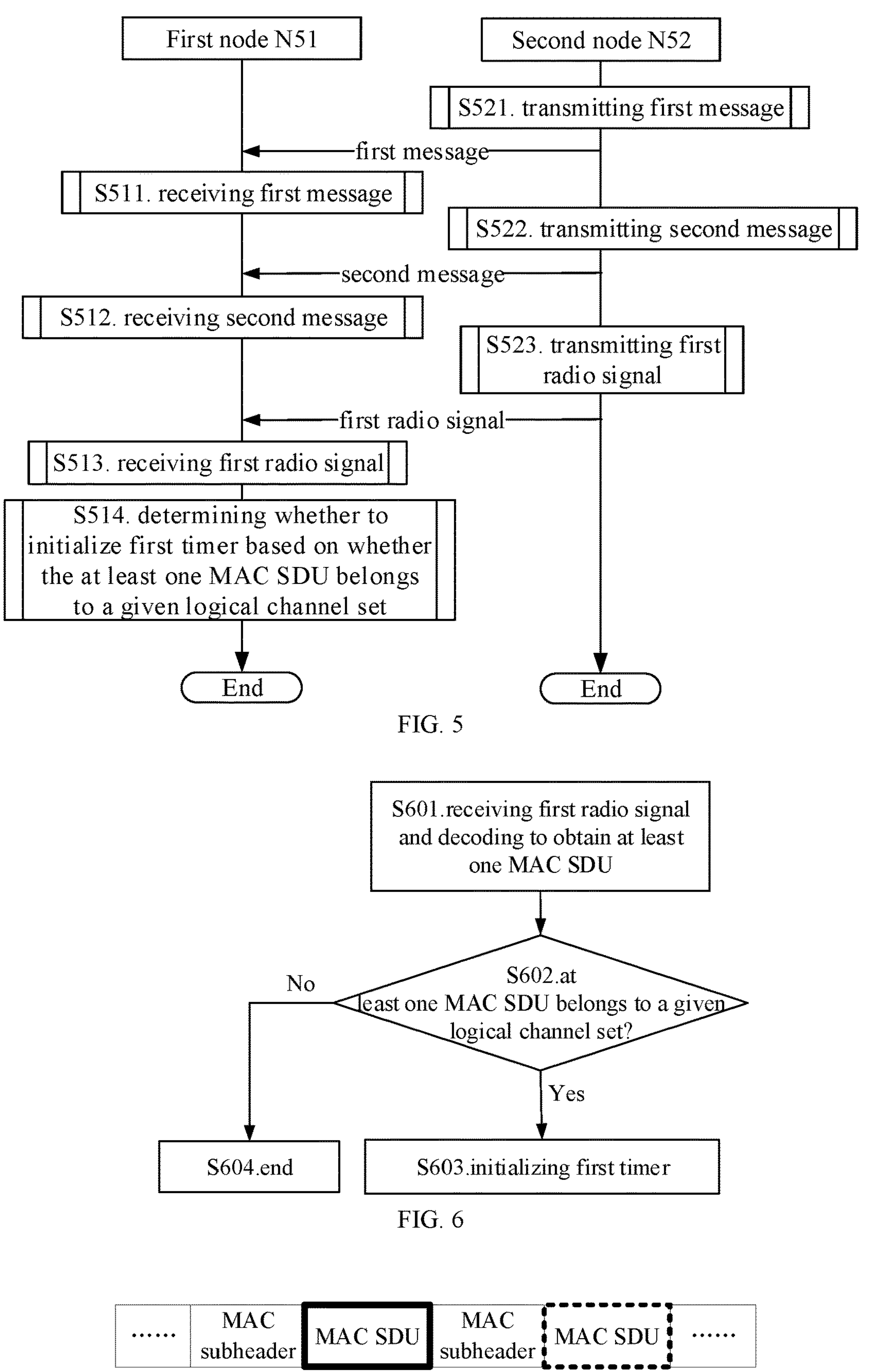
FIG. 5 illustrates a flowchart of radio signal transmission according to one embodiment of the present application.
FIG. 6 illustrates a flowchart of processing of a first node according to one embodiment of the present application.
FIG. 7 illustrates a schematic diagram of a first MAC PDU according to one embodiment of the present application.

Embodiment 5 illustrates a flowchart of radio signal transmission according to one embodiment of the present application, as shown in FIG. 5. A first node and a second node are in communication via an air interface. It should be particularly noted that the sequence illustrated herein does not set any limit to the signal transmission order or implementation order in the present application.

The first node N51 receives a first message in step S511; and receives a second message in step S512; and receives a first radio signal in step S513; and determines whether to initialize a first timer according to whether the at least one MAC SDU belongs to a given logical channel set in step S514.

The second node N52 transmits a first message in step S521; and transmits a second message in step S522; and transmits a first radio signal in step S523.

In Embodiment 5, receiving a first radio signal, and decoding the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and determining whether to initialize a first timer according to whether the at least one MAC SDU belongs to a given logical channel set, the given logical channel set being a subset of the target logical channel set; herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node; the first node is in an RRC state other than RRC-Idle; as a response to expiration of the first timer, conveying a first indication to an upper layer from a MAC sublayer; herein, the first timer is maintained in the MAC sublayer; receiving a first message, the first message indicating at least one multicast MRB; herein, each multicast MRB of the at least one multicast MRB is associated with an interested MBS session of the first node; receiving a second message, the second message indicating at least one logical channel; herein, each logical channel of the at least one logical channel is associated with a multicast MRB of the at least one multicast MRB; the at least one logical channel belongs to the given logical channel set; the non-unicast RNTI being a G-RNTI, or a G-CS-RNTI; a logical channel that belongs to the target logical channel set but does not belong to the given logical channel set being not configured for the first node; herein, at least one logical channel comprised in the target logical channel set does not belong to the given logical channel set.

It should be noted that the first radio signal in FIG. 5 can, although not shown, be received by a node other than the first node.

In one embodiment, the second node is a base station for a serving cell of the first node.

In one embodiment, the second node is a base station for a primary cell (PCell) of the first node.

In one embodiment, the second node is a base station for a secondary cell (SCell) of the first node.

In one embodiment, the second node is a base station for a camping cell of the first node.

In one embodiment, the first node is in an RRC state other than RRC-Idle.

In one embodiment, the RRC state other than RRC_Idle refers to RRC_Connected or RRC_Inactive.

In one embodiment, the RRC state other than RRC_Idle refers to RRC_Connected.

In one embodiment, the RRC state other than RRC_Idle refers to RRC_Inactive.

In one embodiment, a first message is received through an air interface.

In one embodiment, a target receiving node of the first message only includes the first node.

In one embodiment, a radio signal bearing the first message is scrambled by a C-RNTI of the first node.

In one embodiment, the first message is a higher-layer message.

In one embodiment, the first message comprises all or partial Information Elements (IEs) in a Radio Resource Control (RRC) signaling.

In one embodiment, the first message comprises all or part of fields of an IE in an RRC signaling.

In one embodiment, the first message is used for configuring a multicast MBS radio bearer (MRB) for the first node, the multicast MRB being used for transmitting an interested MBS session of the first node.

In one embodiment, the first message indicates at least one multicast MBS radio bearer (MRB); herein, each multicast MRB of the at least one multicast MRB is associated with an interested MBS session of the first node.

In one embodiment, the first message comprises at least one multicast MBS radio bearer (MRB) identifier and MBS session identifier(s) associated with each of the at least one multicast MRB identifier; herein, the multicast MBS radio bearer (MRB) identifier is used for identifying one multicast MRB; the MBS session identifier is used for identifying one interested MBS session of the first node.

In one embodiment, the first message comprises an IE named RadioBearerConfig, the IE comprising a MRB-ToAddModList field, the MRB-ToAddModList field comprising at least one MRB-ToAddMod field, where each of the at least one MRB-ToAddMod field comprises a multicast MBS radio bearer (MRB) identifier and a Temporary Mobile Group Identity (TMGI); herein, the multicast MRB identifier is used for indicating a multicast MRB, the multicast MRB being used for an interested MBS session of the first node which is indicated by the TMGI.

In one embodiment, a second message is received through an air interface.

In one embodiment, a target receiving node of the second message only includes the first node.

In one embodiment, a radio signal bearing the second message is scrambled by a Cell-RNTI (C-RNTI) of the first node.

In one embodiment, the second message is a higher-layer message.

In one embodiment, the second message comprises all or partial Information Elements (IEs) in a Radio Resource Control (RRC) signaling.

In one embodiment, the second message comprises all or part of fields of an IE in an RRC signaling.

In one embodiment, the first message and the second message are respectively transmitted by means of unicast.

In one embodiment, the first message and the second message are comprised in a same RRC signaling.

In one embodiment, the first message and the second message are comprised in different RRC signalings.

In one embodiment, the second message is used for configuring a logical channel for each multicast MRB of the at least one multicast MRB.

In one embodiment, the second message indicates at least one logical channel; herein, each logical channel of the at least one logical channel is associated with a multicast MRB of the at least one multicast MRB.

In one embodiment, the second message comprises at least one logical channel identifier and multicast MRB identifier(s) associated with each of the at least one logical channel identifier; herein, the logical channel identifier is used for identifying a logical channel; the logical channel corresponds to a multicast MRB identified by the multicast MRB identifier.

In one embodiment, the second message comprises an IE named cellGroupConfig, the IE comprising a rlc-Bearer-ToAddModList field, the rlc-BearerToAddModList field comprising at least one RLC-BearerConfig field, where each RLC-BearerConfig field in the rlc-BearerToAddModList field comprises a logical channel identifier and a multicast MRB identifier; herein, the logical channel identifier is used for identifying a logical channel, the logical channel corresponding to a multicast MRB identified by the multicast MRB identifier.

In one embodiment, the at least one logical channel indicated by the second message belongs to the given logical channel set.

In one embodiment, the at least one logical channel indicated by the second message constitutes/constitute the given logical channel set.

In one embodiment, the first node maintains the given logical channel set.

In one embodiment, the multicast MBS radio bearer is configured to be transmitted only through PTM.

In one embodiment, the multicast MBS radio bearer is configured to be transmitted only through PTM RLC.

In one embodiment, the multicast MBS radio bearer is a multicast PTM-only MRB.

In one embodiment, the multicast MBS radio bearer is configured to be transmitted through PTM and Point to Point (PTP) simultaneously.

In one embodiment, the multicast MBS radio bearer is configured to be transmitted through PTM RLC and PTP RLC simultaneously.

In one embodiment, the multicast MBS radio bearer is a split MRB.

In one embodiment, a logical channel that belongs to the target logical channel set but does not belong to the given logical channel set is not configured for the first node.

In one embodiment, a logical channel that belongs to the target logical channel set but does not belong to the given logical channel set is not configured for the first node by means of unicast.

In one embodiment, a logical channel that belongs to the target logical channel set but does not belong to the given logical channel set is configured for a node other than the first node.

In one subembodiment of the above three embodiments, at least one logical channel comprised in the target logical channel set does not belong to the given logical channel set.

In one embodiment, the given logical channel set is a proper subset of the target logical channel set.

In one embodiment, as a response to the first timer being expired, a first indication is conveyed from a MAC sublayer of the first node to an upper layer of the first node; the first indication is used for indicating that the first timer is expired.

In one subembodiment, the first timer is a dataInactivityTimer. In one embodiment, the upper layer is an RRC sublayer.

In one embodiment, the upper layer is a layer above an RRC sublayer.

In one embodiment, the first indication is used for inter-layer information interaction.

In one embodiment, the first indication is inter-layer primitives.

In one embodiment, the first indication is used to trigger a transition of RRC state of the first node.

In one embodiment, when the first node is in an RRC Connected state and an upper layer of the first node receives the first indication from a lower layer of the first node, the first node transits to the RRC Idle state.

In one embodiment, when the first node is in an RRC Inactive state and an upper layer of the first node receives the first indication from a lower layer of the first node, the first node determines whether to transit the RRC state depending on whether it is in a Small Data Transmission (SDT) procedure; herein, when the first node is in an SDT procedure, do not transit to another RRC state; when the first node is not in the SDT procedure, transit to an RRC Idle state.

In one embodiment, when the first node is in an RRC Inactive state and an upper layer of the first node receives the first indication from a lower layer of the first node, the first node determines whether to transit the RRC state depending on whether a second timer is running; herein, when the second timer is running, do not transit to another RRC state; when the second timer is not running, transit to an RRC Idle state.

In one embodiment, the lower layer is a MAC sublayer.

In one embodiment, the second timer is started when transmitting a first RRC message in an SDT procedure.

In one embodiment, the second timer is started when transmitting a first RRC message in an RRC connection recovery procedure.

In one embodiment, the second timer is not running upon expiration.

In one embodiment, a first RRC in the SDT procedure and a first RRC message in the RRC connection recovery procedure are respectively RRCResumeRequests.

In one embodiment, a first RRC in the SDT procedure and a first RRC message in the RRC connection recovery procedure are respectively RRCResumeRequest1s.

In one embodiment, the first timer is maintained in a MAC sublayer of the first node.

In one embodiment, the second timer is maintained in an upper layer of the first node.

In one embodiment, an expiration value of the first timer is configured by the second node.

In one embodiment, the expiration value of the first timer is pre-configured.

In one embodiment, the expiration value of the first timer is expressed in seconds.

In one embodiment, the expiration value of the first timer is expressed in milliseconds.

In one embodiment, the expiration value of the first timer is expressed in subframes.

In one embodiment, the expiration value of the first timer is expressed in slots.

In one embodiment, an expiration value of the second timer is configured by the second node.

In one embodiment, the expiration value of the second timer is pre-configured.

In one embodiment, the expiration value of the second timer is expressed in seconds.

In one embodiment, the expiration value of the second timer is expressed in milliseconds.

In one embodiment, the expiration value of the second timer is expressed in subframes.

In one embodiment, the expiration value of the second timer is expressed in slots.

In one embodiment, the first timer is maintained in a physical layer of the first node.

In one embodiment, the first timer is associated with an active downlink BWP.

In one embodiment, the first timer is associated with an active downlink BWP of a serving cell of the first node.

In one embodiment, the first timer is associated with an active downlink BWP of a camping cell of the first node.

In one embodiment, the first timer is associated with an active downlink BWP of a Special Cell (SpCell) of the first node.

In one embodiment, as a response to the first timer being expired, a BandWidth Part (BWP) handover is performed.

In one subembodiment, the first timer is a bwp-InactivityTimer.

In one subembodiment, if a defaultDownlinkBWP-Id is configured, transit to a BWP indicated by the defaultDownlinkBWP-Id.

In one subembodiment, if a defaultDownlinkBWP-Id is not configured, transit to an initialDownlinkBWP.

In one embodiment, the non-unicast RNTI is a Group-RNTI (G-RNTI), or, a Group-Configured Scheduling-RNTI (G-CS-RNTI).

In one embodiment, the non-unicast RNTI is a G-RNTI.

In one embodiment, the non-unicast RNTI is a G-CS-RNTI.

In one embodiment, the non-unicast RNTI is used for scheduling transmissions for at least one UE.

In one embodiment, the G-RNTI is used for dynamically scheduling transmissions for at least one UE.

In one embodiment, the G-RNTI is used for dynamically scheduling MBS PTM transmission.

In one embodiment, the G-CS-RNTI is used for scrambling a radio signal transmitted on radio resources that are semi-persistently allocated; the radio resources that are semi-persistently allocated are used for multicast transmission.

In one embodiment, the G-CS-RNTI is used to activate, or reactivate, or deactivate a configured scheduled multicast transmission.

In one embodiment, the G-CS-RNTI is used for a retransmission of a configured scheduled multicast transmission.

In one embodiment, the G-RNTI and the G-CS-RNTI are respectively used for uniquely identifying an MBS session.

In one embodiment, the G-RNTI and the G-CS-RNTI are respectively used for uniquely identifying an MBS session within the second node.

In one embodiment, the non-unicast RNTI is associated with at least one multicast MRB; each of the at least one multicast MRB is configured for the first node.

In one embodiment, the non-unicast RNTI is associated with Q multicast MRBs; at least one multicast MRB of the Q multicast MRBs is not configured for the first node; herein, Q is a positive integer greater than 1.

In one embodiment, the non-unicast RNTI is associated with Q multicast MRBs; Q1 multicast MRB(s) of the Q multicast MRBs is(are) configured for the first node; Q2 multicast MRB(s) of the Q multicast MRBs is(are) configured for a node other than the first node; herein, at least one of the Q1 multicast MRB(s) configured for the first node belongs to the Q2 multicast MRB(s) configured for a node other than the first node; at least one of the Q1 multicast MRB(s) configured for the first node doesn't belong to the Q2 multicast MRB(s) configured for a node other than the first node; herein, Q1 and Q2 are respectively no greater than the Q, which is a positive integer greater than 2.

Embodiment 6

Embodiment 6 illustrates a flowchart of processing of a first node according to one embodiment of the present application, as shown in FIG. 6. Steps in FIG. 6 are performed by the first node.

In Embodiment 6, receiving a first radio signal and decoding for obtaining at least one MAC SDU in step S601; determining in step S602 whether the at least one MAC SDU belongs to a given logical channel set; If so, performing step S603; if not, calling an end to it; initializing a first timer in step S603.

In one embodiment, the first radio signal is scrambled by the non-unicast RNTI, decoding the first radio signal for obtaining at least one MAC SDU and corresponding logical channel identifier(s); when the at least one logical channel identifier indicates at least one Multicast MRB logical channel associated with the non-unicast RNTI, the first timer is initialized; when the at least one logical channel identifier does not indicate at least one Multicast MRB logical channel associated with the non-unicast RNTI, the first timer is not initialized.

Embodiment 7

Embodiment 7 illustrates a schematic diagram of a first MAC PDU according to one embodiment of the present application, as shown in FIG. 7. In FIG. 7, the thick-line box represents a MAC SDU that belongs to a given logical channel set, and the dotted-line box represents a MAC SDU that belongs to a target logical channel set but does not belong to a given logical channel set.

In one embodiment, a MAC PDU comprises at least one MAC subPDU.

In one embodiment, a MAC SDU and a MAC subheader constitute a MAC subPDU, the MAC subheader comprising a logical channel identifier, the logical channel identifier indicating a logical channel to which the MAC SDU belongs.

In one embodiment, when a MAC subPDU comprises a MAC SDU that belongs to the target logical channel set but does not belong to the given logical channel set, the first node drops the MAC subPDU.

In one embodiment, when a MAC subPDU comprises a MAC SDU that belongs to the given logical channel set, the MAC SDU is conveyed to an RLC sublayer of the first node for further processing.

In one embodiment, a radio signal bearing a MAC SDU that belongs to the target logical channel set is scrambled by the non-unicast RNTI.

In one embodiment, a MAC SDU that belongs to the target logical channel set can be multiplexed to be transmitted in a MAC PDU.

In one embodiment, multiplexing gains can be obtained by means of the above method.

Embodiment 8

Figures 8, 9:
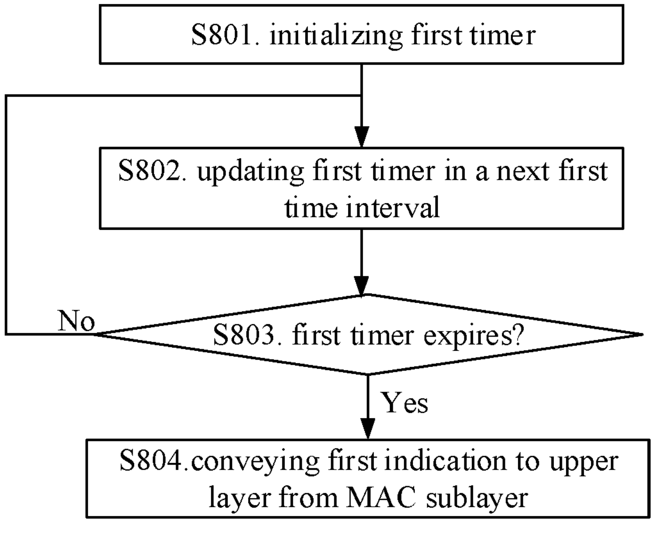
FIG. 8 illustrates a flowchart of running of a first timer according to one embodiment of the present application.
FIG. 9 illustrates a structure block diagram of a processing device in a first node according to one embodiment of the present application.

Embodiment 8 illustrates a flowchart of running of a first timer according to one embodiment of the present application, as shown in FIG. 8. Steps in FIG. 8 are performed by the first node.

In Embodiment 8, a first timer is initialized in step S801; in step S802, the first timer is updated in a next first time interval; in step S803, determining whether the first timer is expired, if so, convey a first indication to an upper layer from a MAC sublayer, if not, go back to step S802.

In one embodiment, when the first timer is running, update the first timer per said first time interval.

In one embodiment, after the first timer is expired, stop updating the first timer per said first time interval.

In one embodiment, the first time interval is 1 second (s).

In one embodiment, the first time interval is 1 millisecond (ms).

In one embodiment, the first time interval is a subframe.

In one embodiment, the first time interval is a subframe for frequency range 1 (FR1).

In one embodiment, the first time interval is a half subframe.

In one embodiment, the first time interval is a half subframe for frequency range 2 (FR2).

In one embodiment, the first time interval is a slot.

In one embodiment, the expiration value of the first timer comprises at least one said first time interval.

In one embodiment, the expiration value of the first timer uses a same unit of measurement as the first time interval.

In one embodiment, a value of the first timer is set to 0 when initializing the first timer, the phrase of updating the first timer comprising: incrementing the value of the first timer by 1; when the value of the first timer is the expiration value of the first timer, the first timer is expired.

In one embodiment, a value of the first timer is set to the expiration value of the first timer when initializing the first timer, the phrase of updating the first timer comprising: decrementing the value of the first timer by 1; when the value of the first timer is 0, the first timer is expired.

In one embodiment, the first timer is updated at an end time of a subframe; herein, a length of the subframe corresponds to FR1.

In one embodiment, the first timer is updated at an end time of a half subframe; herein, a length of the subframe corresponds to FR2.

In one embodiment, the first timer has been running since it started; the first timer stops running upon expiration.

In one embodiment, when the first time interval is 1 ms, the next one first time interval is an upcoming 1 millisecond.

In one embodiment, when the first time interval is a subframe, the next one first time interval is an upcoming subframe.

In one embodiment, when the first time interval is a slot, the next one first time interval is an upcoming slot.

Embodiment 9

Embodiment 9 illustrates a structure block diagram of a processing device in a first node according to one embodiment of the present application, as shown in FIG. 9. In FIG. 9, a processing device in a first node 900 is comprised of a first receiver 901 and a first processor 902; the first node 900 is a UE.

In Embodiment 9, the first receiver 901 receives a first radio signal, and decodes the first radio signal for obtaining a first MAC PDU, the first MAC PDU comprising at least one MAC SDU, any MAC SDU of the at least one MAC SDU belonging to a target logical channel set, the target logical channel set comprising at least one logical channel; and the first processor 902 determines whether to initialize a first timer according to whether the at least one MAC SDU belongs to a given logical channel set, the given logical channel set being a subset of the target logical channel set; herein, the first radio signal is scrambled by a non-unicast RNTI; the action of determining whether to initialize a first timer according to whether the at least one MAC SDU belongs to a given logical channel set comprises: if any of the at least one MAC SDU belongs to the given logical channel set, initializing the first timer; if none of the at least one MAC SDU belongs to the given logical channel set, not initializing the first timer; any logical channel in the target logical channel set is used for multicast MBS; any logical channel in the given logical channel set is used for an interested MBS session of the first node.

In one embodiment, the first node is in an RRC state other than RRC-Idle.

In one embodiment, the first processor 902, as a response to expiration of the first timer, conveys a first indication to an upper layer from a MAC sublayer; herein, the first timer is maintained in the MAC sublayer.

In one embodiment, the first receiver 901 receives a first message, the first message indicating at least one multicast MBS Radio Bearer (MRB); herein, each multicast MRB of the at least one multicast MRB is associated with an interested MBS session of the first node.

In one embodiment, the first receiver 901 receives a first message, the first message indicating at least one multicast MBS Radio Bearer (MRB); herein, each multicast MRB of the at least one multicast MRB is associated with an interested MBS session of the first node; the first receiver 901 receives a second message, the second message indicating at least one logical channel; herein, each logical channel of the at least one logical channel is associated with a multicast MRB of the at least one multicast MRB; the at least one logical channel belongs to the given logical channel set.

In one embodiment, the non-unicast RNTI is a G-RNTI, or a G-CS-RNTI.

In one embodiment, a logical channel that belongs to the target logical channel set but does not belong to the given logical channel set is not configured for the first node; herein, at least one logical channel comprised in the target logical channel set does not belong to the given logical channel set.

In one embodiment, the first receiver 901 comprises the receiver 454 (comprising the antenna 452), the receiving processor 456, the multi-antenna receiving processor 458 and the controller/processor 459 in FIG. 4 of the present application.

In one embodiment, the first receiver 901 comprises at least one of the receiver 454 (comprising the antenna 452), the receiving processor 456, the multi-antenna receiving processor 458 or the controller/processor 459 in FIG. 4 of the present application.

In one embodiment, the first processor 902 comprises the controller/processor 459 in FIG. 4 of the present application.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first-type communication node or UE or terminal in the present application includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts, etc. The second-type communication node or base station or network-side device in the present application includes but is not limited to macro-cellular base stations, micro-cellular base stations, home base stations, relay base station, eNB, gNB, Transmitter Receiver Point (TRP), relay satellite, satellite base station, airborne base station, test equipment like transceiving device simulating partial functions of base station or signaling tester and other radio communication equipment.

It will be appreciated by those skilled in the art that this application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) comprising:

a transceiver; and a processor;

wherein the transceiver and the processor are configured to:

receive a Physical Downlink Shared Channel (PDSCH) transmission including a media access control (MAC) protocol data unit (PDU), the MAC PDU including at least one MAC service data unit (SDU), any MAC SDU of the at least one MAC SDU being associated with a logical channel in a target logical channel set comprising at least one logical channel;

determine whether the at least one MAC SDU is associated with a logical channel belonging to a given logical channel set, the given logical channel set being a subset of the target logical channel set;

on a condition that the at least one MAC SDU is associated with the logical channel belonging to the given logical channel set, start or restart a data inactivity timer; and on a condition that the data inactivity timer expires, indicate, to an upper layer of the UE, that the data inactivity timer expired;

wherein the logical channel belonging to the given logical channel set is a multicast and broadcast service traffic channel (MTCH).

2. The UE of claim 1, wherein the UE is in a RRC_CONNECTED state.

3. The UE of claim 1, wherein the PDSCH transmission is scrambled using a non-unicast Radio Network Temporary Identifier (RNTI).

4. The UE of claim 3, wherein the non-unicast RNTI is one of a Group-RNTI (G-RNTI) or a Group-Configured Scheduling (G-CS-RNTI).

5. The UE of claim 3, wherein the PDSCH transmission includes a transport block.

6. The UE of claim 1, wherein the logical channel belonging to the given logical channel set is used for multicast and broadcast services (MBS).

7. The UE of claim 1, wherein the logical channel belonging to the given logical channel set is associated with a multicast resource bearer.

8. The UE of claim 1, wherein the at least one MAC SDU is indicated by a logical channel identity (LCID) associated with the logical channel.

9. A method performed by a user equipment (UE), the method comprising:

receiving a Physical Downlink Shared Channel (PDSCH) transmission including a media access control (MAC) protocol data unit (PDU), the MAC PDU including at least one MAC service data unit (SDU), any MAC SDU of the at least one MAC SDU being associated with a logical channel in a target logical channel set comprising at least one logical channel;

determining that the at least one MAC SDU is associated with a logical channel belonging to a given logical channel set, the given logical channel set being a subset of the target logical channel set;

based on the MAC SDU being associated with the logical channel belonging to the given logical channel set, starting or restarting a data inactivity timer; and upon the data inactivity timer expiring, indicating, to an upper layer of the UE, that the data inactivity timer expired;

wherein the logical channel belonging to the given logical channel set is a multicast and broadcast service traffic channel (MTCH).

10. The method of claim 9, wherein the UE is in a RRC_CONNECTED state.

11. The method of claim 9, wherein the PDSCH transmission is scrambled using a non-unicast Radio Network Temporary Identifier (RNTI).

12. The method of claim 11, wherein the non-unicast RNTI is one of a Group-RNTI (G-RNTI) or a Group-Configured Scheduling (G-CS-RNTI).

13. The method of claim 9, wherein the PDSCH transmission includes a transport block.

14. The method of claim 9, wherein the logical channel belonging to the given logical channel set is used for multicast and broadcast services (MBS).

15. The method of claim 9, wherein the logical channel belonging to the given logical channel set is associated with a multicast resource bearer.

16. The method of claim 9, wherein the at least one MAC SDU is indicated by a logical channel identity (LCID) associated with the logical channel.

* * * * *